April 14, 1959     L. DE MOSS     2,881,469

FISH SKINNING APPARATUS

Filed Aug. 28, 1956

INVENTOR.
LEONARD DE MOSS
BY
ATTORNEY 2,881,469

FISH SKINNING APPARATUS

Leonard De Moss, Des Moines, Iowa

Application August 28, 1956, Serial No. 606,594

1 Claim. (Cl. 17—2)

This invention relates generally to fish cleaning devices and more particularly to a fish skinning apparatus.

An object of this invention is to provide an improved apparatus for skinning fish.

A further object of this invention is to provide a fish skinning apparatus in which the skin is pulled from a fish, concurrently with the loosening of the skin on the fish by a blade member.

Another object of this invention is to provide a fish skinning apparatus which is adapted to be clamped to a stationary support to facilitate the fish skinning operation.

A further object of this invention is to provide a fish skinning apparatus in which a pair of side by side shafts having coacting teeth formed thereon are used to peel the skin from the fish.

Still a further object of this invention is to provide a fish skinning apparatus which is simple in construction, economical to manufacture, and efficient in operation in removing skin from a fish.

Figure 1:
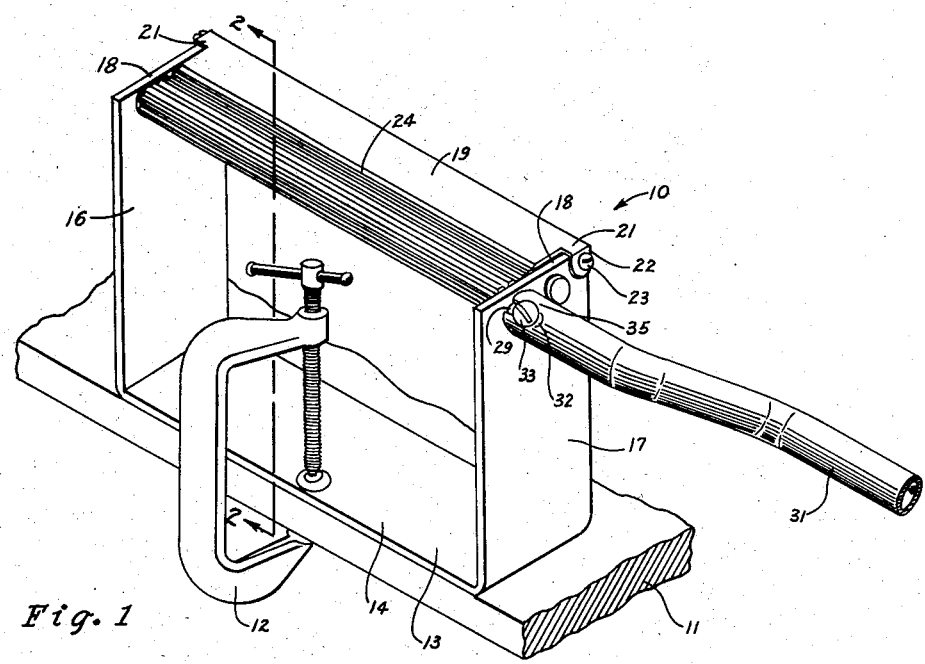
Figure 2:
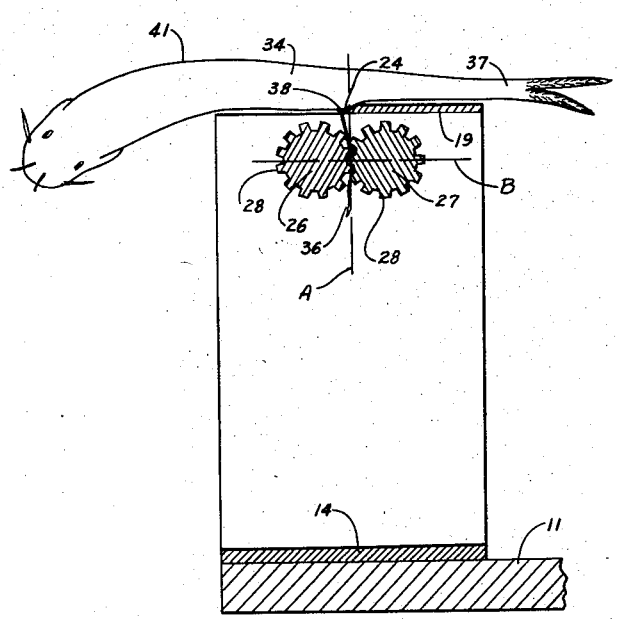

Further objects, features and advantages of this invention will become apparent from a consideration of the following description when taken in connection with the accompanying drawing in which:

Fig. 1 is a perspective view of the fish skinning apparatus of this invention, shown clamped to a stationary support, only a fragmentary portion of which is shown; and Fig. 2 is a transverse sectional view looking along the line 2—2 in Fig. 1 and showing a fish in a supported position on the apparatus of this invention, and with a portion of its skin removed.

With reference to the drawing, the apparatus of this invention, indicated generally at 10, is illustrated in Fig. 1 clamped to a stationary horizontal support 11 by means of an ordinary C-clamp 12. The apparatus 10 consists of a generally U-shape frame 13 having a base portion 14 and a pair of parallel leg portions 16 and 17. Supported on and positioned between the terminal ends 18 of the frame leg portions 16 and 17, is a blade member 19 having a pair of outwardly projected ears 21 provided with downwardly projected extensions 22 positioned outwardly of and secured to the leg portions 16 and 17 by means of screws 23. The blade 19 is formed with a relatively sharp edge 24 for a purpose to appear later.

Positioned below and in a parallel relation with the blade member 19 are a pair of shafts 26 and 27 arranged side by side between and rotatably supported on the frame leg portions 16 and 17. The shafts 26 and 27 are of a gear shape in transverse cross section and have coacting meshing teeth 28 to provide for concurrent rotation of the shafts 26 and 27 in opposite directions on rotation of the shaft 26. For this purpose the shaft 26 is provided with an axial extension 29 (Fig. 1) that projects outwardly of the leg 17 to receive a tubular handle 31 having a longitudinally extended slot 32 at one end 35. The handle end 35 is telescopically receivable on the extension 29 such that a screw 33 mounted on and projected laterally of the shaft 29 is positioned in the slot 32. As a result, on rotation of the handle 31, the shafts 26 and 27 are rotated in opposite directions. To remove the handle 31 from the projection 29, it is only necessary to move the handle 31 axially of and in a direction away from the extension 29.

In use, a fish body 34 (Fig. 2), having a portion 36 of the skin at the tail end 37 thereof peeled back, is manually held on the apparatus 10. The body 34 is positioned such that the tail end 37 is on the blade member 19, with the sharp blade edge 24 positioned at the juncture 38 of the peeled back skin 36 and the fish body 34 and the free end of the skin portion 36 is gripped between the teeth 28 on the shafts 26 and 27. The skin 36 is then drawn between the shafts 26 and 27 as shown in Fig. 2, on rotation of the handle 31 in a clockwise direction as viewed in Fig. 1. Concurrently with this action of the shafts 26 and 27 to pull the skin 36 downwardly therebetween and away from the fish body 34, the body 34 is advanced or fed across the blade 19, by the pulling action on the skin 36, in a direction toward the right as viewed in Fig. 2, so that the blade edge 24 acts to separate the skin from the fish body 34.

In this connection it will be noted (Fig. 2) that the blade edge 24 extends longitudinally of the shafts 26 and 27 and in a parallel spaced relation therewith at a position slightly forwardly of a plane, indicated at A, extended through the meshing teeth 28 for the shafts 26 and 27 and arranged substantially normal to a common plane, indicated at B, for the axes of the shafts 26 and 27. The blade 19 thus functions as a support for the fish body 34, a cutter for separating the skin 36 from the fish body, and a stop or guide for directing the cut skin between the shafts 26 and 27. By virtue of the arrangement of the blade edge 24 slightly forwardly of the plane A, a desired cutting and separating action of the blade 19 is assured with a minimum risk of cutting through the skin 36.

The fish body 34 is advanced across the blade 19, under the pulling action on the skin 36 until the skin on one side of the body 34 has been completely removed. The fish body 34 is then turned over so that the opposite side 41 thereof is adjacent the blade 19. Similarly to the operation above described a portion of the skin is then peeled back from the tail end 37 of the body 34 on the side 41 thereof and fed or started between the shafts 26 and 27. The handle 31 is then rotated concurrently with movement of the fish body 34 across the blade 19 to separate the skin from the side 41.

It is seen, therefore, that the blade 19 coacts with the two shafts 26 and 27 to separate skin from the fish body 34 concurrently with movement of such skin in a direction away from the body 34. The shafts 26 and 27 maintain the skin in a taut condition so that the edge 24 of the blade 19 readily separates such skin from the body 34.

For compact storage of the apparatus 10, the handle 31 is readily removed by moving it in a direction axially outwardly of the shaft extension 29 to withdraw the screw 33 from the slot 32. The C clamp 12 is then removed to release the frame 13 from the stationary support 11. The clamp 12, handle 31, and frame 13 are then easily stored as a compact unit.

From the above description, it is seen that this invention provides a fish skinning apparatus 10 which is readily operated by an inexperienced person to quickly remove the skin from a fish body 34. As a result of the clamping of the apparatus 10 to the stationary support 11, the operator has both hands free, one for operating the handle 31 and the other for manipulating the fish body 34.

Although the invention has been described with respect to a preferred embodiment thereof, it is to be understood that it is not to be so limited, since changes can be made therein which are within the scope of the appended claim.

I claim:

Skinning apparatus comprising a frame of U-shape, a pair of shafts supported on the legs of said frame adjacent the free ends thereof and arranged in a side by side relation, coacting engageable teeth means on said shafts for receiving the skin therebetween, a flat blade member having a sharpened edge and mounted on said frame adjacent to the ends of said legs in a substantially parallel spaced relation with a first plane extended through the axes of said shafts, with said sharpened edge being located substantially in a second plane normal to said first plane and extended through engaged teeth on said shafts, and means for rotating one of said shafts whereby said skin is pulled substantially along and within said second plane.

References Cited in the file of this patent

UNITED STATES PATENTS

| 2,254,969 | Lindsey | Sept. 2, 1941 |
| 2,590,747 | Birdseye | Mar. 25, 1952 |
| 2,605,495 | Daniels | Aug. 5, 1952 |

FOREIGN PATENTS

| 77,233 | Norway | July 31, 1950 |
| 741,799 | Great Britain | Dec. 14, 1955 |